Feb. 5, 1957 S. E. MARCUSSON 2,780,375
HAND TRUCK
Filed Dec. 8, 1954 2 Sheets-Sheet 2
FIG. 3
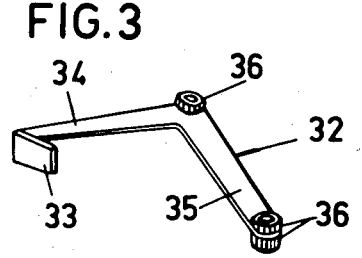
FIG. 4
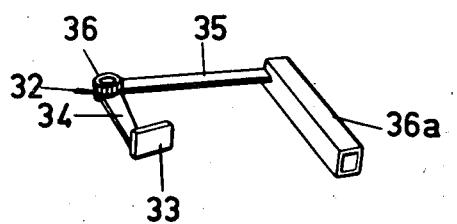
FIG. 5
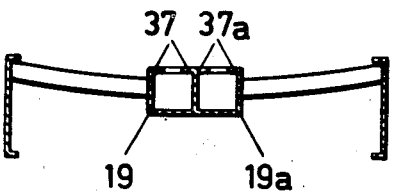
FIG. 6
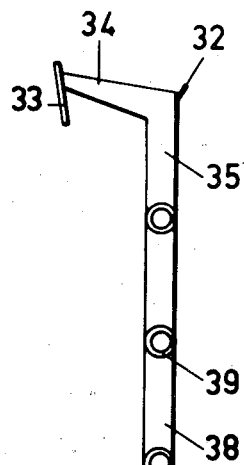
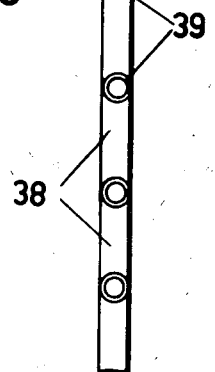
SVEN E. MARCUSSON
INVENTOR
BY Wenderoth, Lind & Ponack
ATTORNEYS

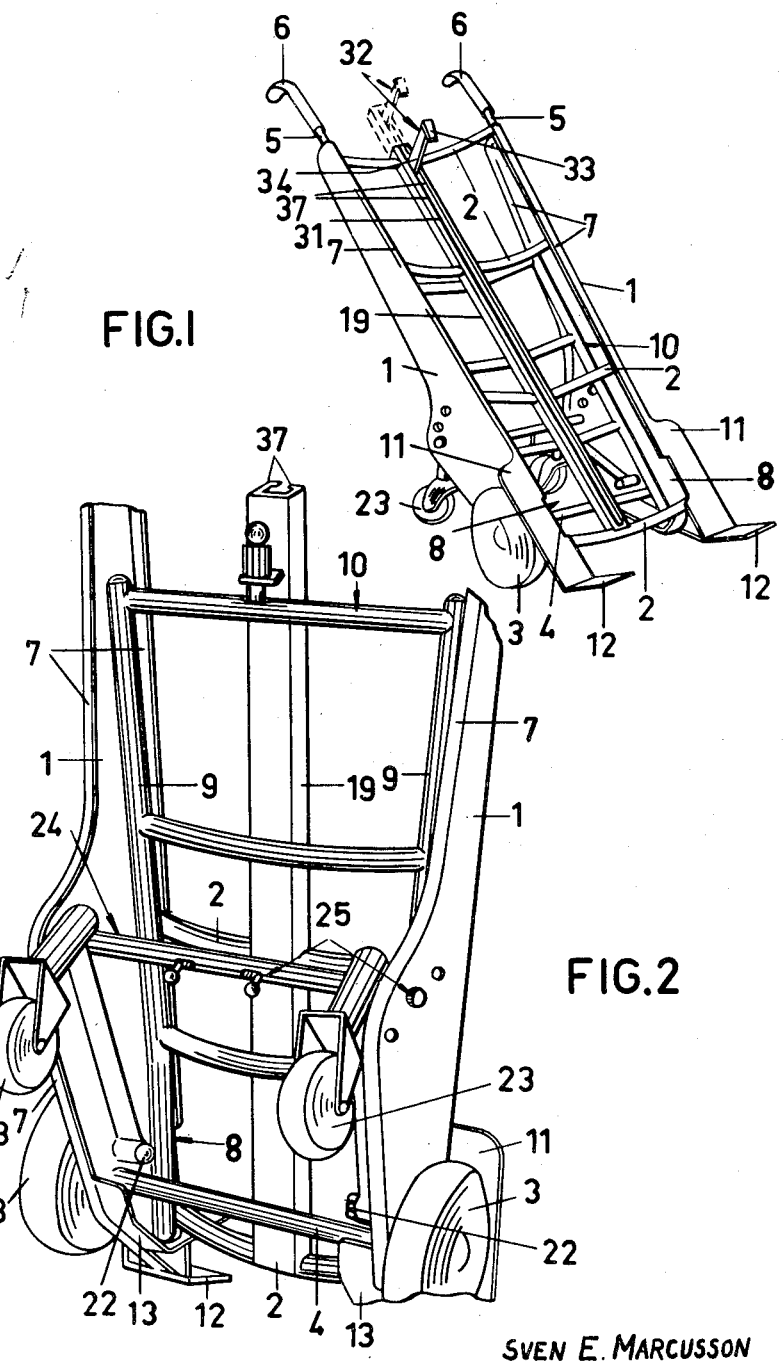

United States Patent Office 2,780,375
Patented Feb. 5, 1957

2,780,375

HAND TRUCK

Sven Erik Marcusson, Angelholm, Sweden, assignor to S. Marcussons Transportvagnfabrik A. B., Angelholm, Sweden, a corporation of Sweden Application December 8, 1954, Serial No. 473,946

3 Claims. (Cl. 214—383)

There have previously been suggested transport trucks of the type which is held more or less angularly inclined in transport position and which consists of an elongated frame provided with wheels at its lower end and fixed gripping means in the proximity of the wheels and with one or more movable gripping means disposed in a slideway extending in the longitudinal direction of the frame. Heretofore, the movable gripping means could either be moved only to a certain limited degree in the upper part of the transport truck for engaging the article to be transported by said truck or, if capable of a higher degree of displacement, they were comparatively complicated and ungainly. The present invention however relates to a transport truck of the kind described above in which the movable gripping means can be adapted to every conceivable type of transport articles or quickly and safely adjusted to engage such article.

The invention will be described in the following, reference being had to the accompanying drawings, in which:

Figs. 1 and 2 show the truck in different perspective views,

Figs. 3 and 4 show details,

Fig. 5 is a cross-section of a modified embodiment of the truck,

Fig. 6 shows a detail of the modified embodiment of the truck as shown in Fig. 5.

The transport truck comprises an elongated frame which is constituted by two side members 1 of all-pressed sheet metal which are interconnected by means of a number of suitably arcuate and preferably tubular transverse members 2 welded to said side members 1. An axle 4 is mounted in the side members 1, forming an axle journal for wheels 3 which projects from either side of the truck. At that end of the frame which is remote from the wheels 3 there are secured, with their one end, two iron handles 5 which on their free ends projecting from the frame are provided with sleeves 6 of a material agreeable to the touch of the hands. As appears from the drawings, the side members 1 are provided practically along their entire periphery with inwardly directed reinforcement flanges 7 which however at a portion adjacent the wheels 3 are open to form recesses 8 through which the free ends of the side members 9 of a load support 10 can be inserted when the latter is brought into operating position. When the load support 10 is not used, it is detachably mounted in the frame of the truck beneath the transverse members 2, as is shown in Figs. 1 and 2. To reinforce the side members 1 at the portions weakened by the openings 8, outwardly directed flanges 11 are arranged which serve as protection for the wheels 3 and at their free, lower ends are bent in an angle and constitute fixed gripping means 12 which, by being pushed under the article to be transported, make it possible to lift the said article upon the truck. In a rearward direction from each of said gripping means 12 there extends a flange 13 (Fig. 2) which reaches and follows the flange 7 of the side member 1 a distance and is suitably secured thereto and/or to the side member.

On the inside of each side member 1 of the truck frame and adjacent the axle 4 there is mounted an inwardly directed axle journal 22 upon which axle journals there is pivotally mounted a frame 24 carrying two supporting wheels 23, which frame, as appears from the drawings, swings the wheels 23 from an inoperative position within the frame into two separate operative positions in which the wheels 23 project from the frame. In either of these positions, the frame 24 and thus the wheels are retained by means of a manually releasable locking device, generally designated 25.

The slideway 19 consists of a quadrilateral, tunnel-shaped tube forming part of the frame and extending from one end of the latter to the other. The tube is open at its upper end and is provided with a central slot 31 in the side located in or facing the loading plane, said slot extending from the open upper end of the tube preferably all the way down to the lower end of the tube. For securing the tube-shaped slideway 19 in the frame and the transverse members 2 thereof, the said transverse members are recessed and welded to the slideway. In the slideway 19 can be inserted movable gripping members 32 of various forms which are thus exchangeably mounted. Each of the gripping members 32 has a portion in the form of an arm 34 which projects through the slot and is provided with a hook 33 to engage the load. The arm 34 is connected with a second arm 35 which makes an angle with the arm 34 and constitutes a portion that can be inserted in the slideway. The arms 34 and 35 may be of different lengths inter se or different gripping members 32 may have different arm lengths. In the embodiment shown in Fig. 3, the movable gripping member 32 is formed by an angularly bent arm which both in the angular portion and at its end remote from the hook 33 is provided with abutments 36 for abutting the inside of flanges 37 that are formed by the arrangement of the slot, said abutments projecting on two opposite sides of the gripping member 32. In the embodiment illustrated in Fig. 4 of the movable gripping member 32, the arm 35 is hingedly connected with a rod 36a which, like the arm 35, can be inserted in the slideway 19. The dotted lines in Fig. 1 show that the rod 36a permits the gripping member 32 to be moved out of the slideway 19 without losing its engagement with the latter. The slideway 19 for the movable gripping members may also be formed by a tube forming two adjacent tunnels and having two slots 31 in the side located in or facing the loading plane, which slots from the open end of the tube preferably extend all the way down to the lower end of the tube and are arranged in the centre of the respective tunnel (Fig. 5). The gripping member 32 according to the embodiment shown in Fig. 6 may be inserted in the portion 19a of the slideway. In this embodiment, the gripping member 32 is connected with one end of a chain 38 constituted by a number of links and provided with abutments 39 projecting in two opposite directions at the hinges of the links. The abutments 39 engage the flanges 37. The slideways 19 and 19a, respectively, may be of any suitable type. Thus, for instance they may consist of T-irons, the flanges of which are adapted to be engaged by the gripping member 32.

If the transport truck is used for instance for moving a barrel, the hook 33 of the arm 34 (Fig. 1) is brought into engagement with the upper edge of the barrel, whereupon the truck is tilted in the usual manner. At the beginning of the tilting movement, the barrel is tilted over, whereby the barrel edge resting against the base is partly lifted out of this resting position upon the base and permits moving the fixed gripping members 12 in under the lower edge of the barrel, whereupon the truck is tilted into the inclined position which is the most comfortable for the operator of the truck. As the movable gripping member 32 may be moved into engagement with the barrel, the operator need not support the barrel with one hand and swing the truck into the suitable driving position with the other hand. The operator is free to use both hands for the latter purpose and can therefore use greater force for bringing the truck into the suitable driving position, and at the same time he need not support the barrel during the transport. The mode of operation is largely the same when the truck is used for transporting crates. As a rule, however, the crates have projecting, spaced apart reinforcement members in the form of ribs or boards on the side of the crate, which reinforcement members run parallel to each other in one direction only on the respective side, thus forming spaces into which the fixed gripping members 12 can be moved into engagement with that side of the crate which is turned against the base upon which it rests, without it being necessary to tilt the crate, and at the same time the movable gripping member 32 is brought into engagement with the opposite side or side edge of the crate, whereupon the truck is moved into the inclined position best suited for a comfortable transport. For certain transports it may be necessary to obtain a safe grip upon the article to be transported. For this purpose, the gripping member 32 with the chain 38 is used by being inserted in the slideway 19a, with or without simultaneous use of the support 10.

As the chain 38 of the gripping member 32 projects out of the slideway 19a with a more or less large number of links, the gripping member 32 can, like a rope or the like, be put partly around the article to be transported and moved into such engagement with said article that the latter is securely held on the truck.

Either the abutments 36 on the arm 34 or the abutments 36 and the rod 36a on the other arm 35, respectively, can form active engagement means with the slideway 19 and thus make it possible to fit the gripping member 32 to transport articles of various kinds.

By lowering the supporting wheels 23, the operator can effortlessly hold the truck in suitable position during the entire transport and push the truck before him. The transport is therefore considerably easier.

The truck according to the invention is a transport device whose many-sided usability and comfortable operation essentially facilitate internal transports.

Modifications within the scope of the invention as set forth in the accompanying claims are possible.

What I claim and desire to secure by Letters Patent is:

1. A hand truck, comprising an elongated frame, longitudinal members in said frame, one of said longitudinal members being arranged centrally in said frame and offset from the other longitudinal members, said centrally arranged longitudinal member being formed by a tube open at the handle end of the truck and having at least one tunnel-shaped guideway therein, said tube having an upwardly open longitudinal slot therein, flanges in said tube formed by the opposed edges of said slot in said tube, a gripping member in said tube having two arms joined together at an angle to each other, hook means at the outermost end of one of said arms, and abutments at the angular joint between said arms and at the outermost end of the other one of said arms projecting from the opposite sides of the gripping member for engagement with said flanges, which said gripping member may be inserted through the open end of said tube and moved longitudinally of the tube either with one or both of said arms projecting through the slot of said tube.

2. A hand truck, comprising an elongated frame, longitudinal members in said frame, one of said longitudinal members being arranged centrally in said frame and offset from the other longitudinal members, said centrally arranged longitudinal member being formed by a hollow tube having a quadrilateral cross section and open at the handle end of the truck to form a tunnel-shaped guideway, said tube having an upwardly open longitudinal slot therein, flanges in said tube formed by the opposed edges of said slot in said tube, a gripping member in said tube having two arms joined together at an angle to each other, hook means at the outermost end of one of said arms, abutments at the angular joint between said arms projecting from opposite sides of the gripping member for engagement with said flanges, and a rod hingedly connected with the gripping member at the outermost end of the other one of said arms forming abutments at the outermost end thereof.

3. A hand truck, comprising an elongated frame, longitudinal members in said frame, one of said longitudinal members being arranged centrally in said frame and offset from the other longitudinal members, said centrally arranged longitudinal member being formed by a tube having a quadrilateral cross section and open at the handle end of the truck and having two adjacent tunnel-shaped guideways therein, said tube having two upwardly open longitudinal slots therein, one in each guideway, two pairs of flanges in said tube formed by the opposed edges of said slots in said tube, gripping members in said tube, one of said gripping members having an angular formation, two arms formed by said angular formation of said gripping member, hook means at the outermost end of one of said arms, a chain comprising links connected by hinges, said chain being connected to the outermost end of the other of said arms, the hinges of said chain projecting laterally from both sides thereof and forming abutments engaging in said guideways.

References Cited in the file of this patent

UNITED STATES PATENTS

| | | |
|---|---|---|
| 499,212 | Coffield | June 13, 1893 |
| 533,069 | Long | Jan. 29, 1895 |
| 618,629 | Watts et al. | Jan. 31, 1899 |
| 1,131,656 | Black | Mar. 16, 1915 |
| 2,612,386 | Schutzer et al. | Sept. 30, 1952 |

FOREIGN PATENTS

| | | |
|---|---|---|
| 318,376 | Great Britain | Sept. 5, 1929 |
| 512,279 | Belgium | Dec. 20, 1952 |